United States Patent
Meier, Jr.

(10) Patent No.: US 6,401,663 B1
(45) Date of Patent: Jun. 11, 2002

(54) PET ENCLOSURE

(76) Inventor: Richard R. Meier, Jr., 890 H St., Golden, CO (US) 80401

( * ) Notice: Subject to any disclaimer, the term of this patent is extended or adjusted under 35 U.S.C. 154(b) by 0 days.

(21) Appl. No.: 09/658,956

(22) Filed: Sep. 11, 2000

(51) Int. Cl.$^7$ ................................................. A01K 1/00
(52) U.S. Cl. ...................................... 119/452; 119/485
(58) Field of Search ............................... 119/452, 165, 119/484, 485

(56) References Cited

U.S. PATENT DOCUMENTS

| 4,021,975 | A |   | 5/1977  | Calkins |         |
|-----------|---|---|---------|---------|---------|
| 4,291,645 | A |   | 9/1981  | Cruchelow et al. | |
| 4,445,459 | A |   | 5/1984  | Julie   |         |
| 4,788,934 | A |   | 12/1988 | Fetter  |         |
| 4,989,546 | A |   | 2/1991  | Cannaday |        |
| 5,148,767 | A |   | 9/1992  | Torchio |         |
| 5,165,366 | A | * | 11/1992 | Harvey  | 119/165 |
| 5,167,202 | A |   | 12/1992 | Bradford et al. | |
| 5,195,457 | A |   | 3/1993  | Namanny |         |
| 5,469,807 | A |   | 11/1995 | Kosmaczeska | |
| 5,522,344 | A |   | 6/1996  | Demurjian |       |
| 5,782,205 | A | * | 7/1998  | Veras   | 119/484 |
| 5,842,438 | A | * | 12/1998 | Messmer | 119/165 |
| 5,970,914 | A | * | 10/1999 | Steil et al. | 119/165 |
| 5,975,017 | A | * | 11/1999 | Cameron | 119/165 |
| D424,249  | S | * | 5/2000  | Banzaca | D30/119 |
| 6,237,534 | B1| * | 5/2001  | Schwartz | 119/165 |

* cited by examiner

Primary Examiner—Yvonne R. Abbott
(74) Attorney, Agent, or Firm—Ancel W. Lewis, Jr.

(57) ABSTRACT

A pet enclosure that mounts to the wall of a building adjacent a window above the ground to provide a protected outside dwelling place for a pet. The enclosure disclosed includes a main housing fastened outside the building and a smaller side passageway member that connects to a lower corner of the window and to an end of the main housing. The main housing has a front panel forming a door to provide access into the enclosure for cleaning with aligning members, latching members and locking members for the front panel in the closed position. A mirror on the passageway member enables viewing of the pet from inside the building.

4 Claims, 2 Drawing Sheets

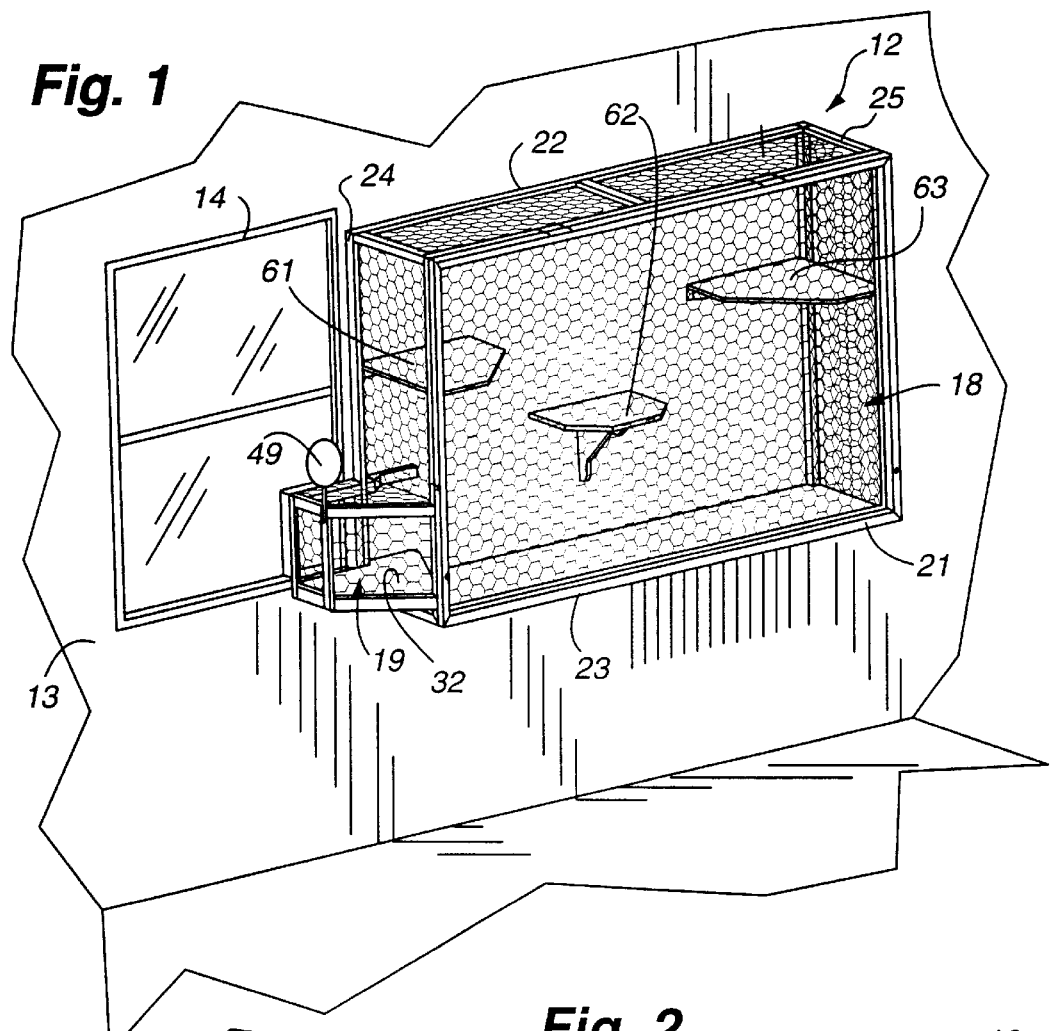
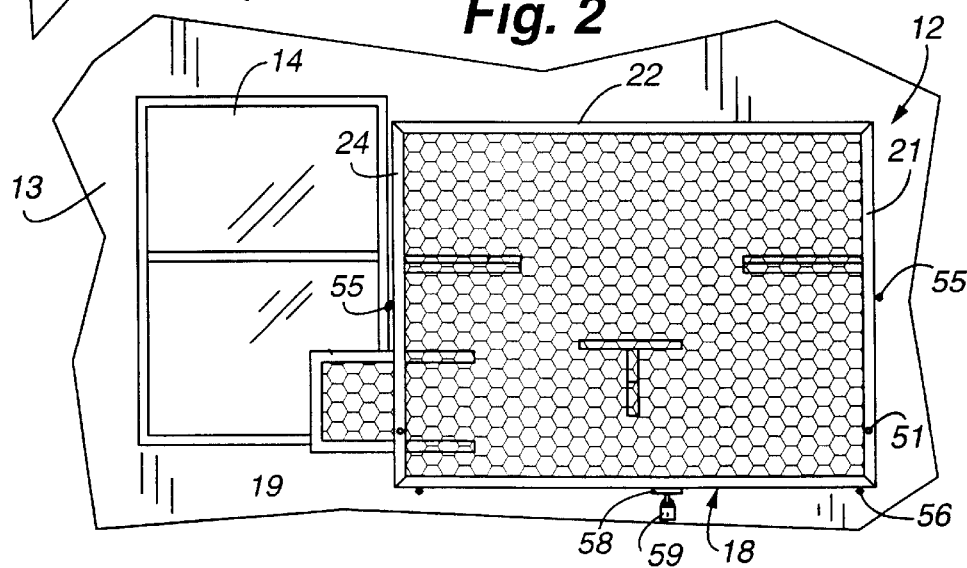

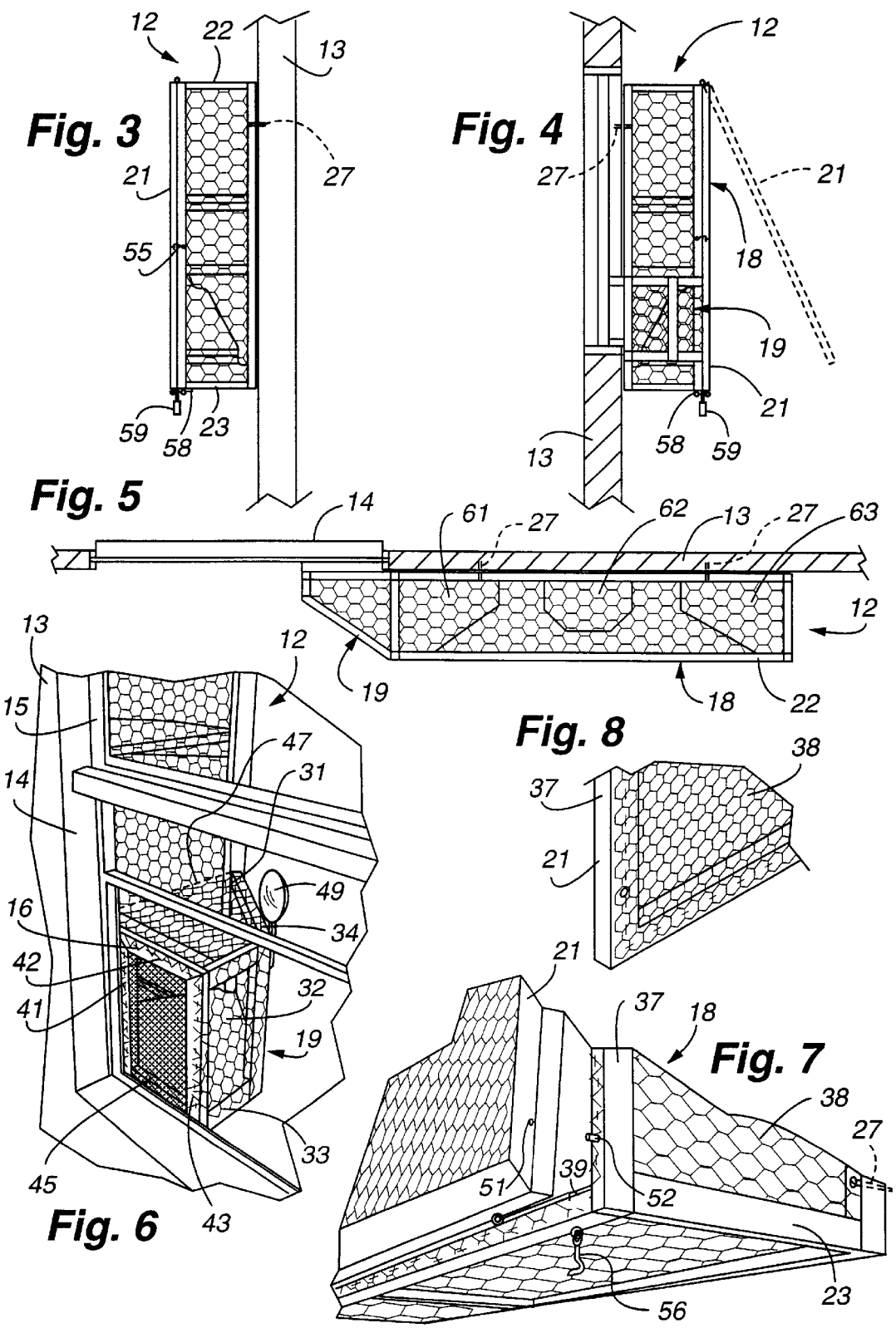

PET ENCLOSURE

TECHNICAL FIELD

This invention relates to pet enclosures and more particularly to a pet enclosure mounted to the exterior of a building for permitting house pets, especially cats, to enjoy an outdoor environment while being protected.

BACKGROUND ART

A variety of different enclosures have heretofore been provided for securing pets, particularly cats, in an enclosure externally of a building and particularly the house. Typically these enclosures are constructed so that the pet may move between the inside of the house and the pet enclosure to take advantage of the outdoors.

Julie U.S. Pat. No. 4,445,459, Cannaday U.S. Pat. No. 4,989,546, Torchio U.S. Pat. No. 5,148,767, Bradford et al. U.S. Pat. No. 5,167,202 and Demurjian U.S. Pat. No. 5,522,344 disclose pet enclosures that mount within a window opening.

Namanny U.S. Pat. No. 5,195,457 and Kosmaczeska U.S. Pat. No. 5,469,807 disclose a pet enclosure that fits on a window sill.

Fetter U.S. Pat. No. 4,788,934 discloses a pet enclosure having a smaller passageway member that connects to one end of the main housing. This pet enclosure rests on the ground and is accessible through a door of a building.

DISCLOSURE OF THE INVENTION

A pet enclosure for mounting to the exterior of a building above the ground adjacent a window is disclosed. The pet enclosure includes a main housing mounted to the exterior wall of the building adjacent a window and a smaller side passageway member connected to one end of the main housing that covers only a fraction of the window to afford ingress and egress for a pet between the main housing and the building while permitting normal use of most of the window. Each panel is made of an open, four-sided framework covered by a wire mesh material. The front panel is pivotally mounted to the top panel to enable access into the main housing. A latch releasably latches the front panel closed and a locking mechanism is provided to lock the front panel closed. A mirror on the passageway member enables viewing of the pet in the main housing from inside the building. A bug barrier screen at one end of the side passageway member inhibits entry of insects into the building.

BRIEF DESCRIPTION OF THE DRAWINGS

Details of this invention are described in connection with the accompanying drawings which like parts bear similar reference numerals in which:

FIG. 1 is a front perspective view of a pet enclosure embodying features of the present invention shown mounted at an elevated position to the side wall of a building adjacent a window.

FIG. 2 is a front elevation view of FIG. 1.

FIG. 3 is a right side elevation view of FIG. 1.

FIG. 4 is a left side elevation view of FIG. 1 with the front panel shown in an opened position in dashed lines.

FIG. 5 is a top plan view of FIG. 1.

FIG. 6 is a fragmentary rear perspective view from the inside of the building looking through the window into the side passageway member.

FIG. 7 is a fragmentary bottom perspective view with the front panel moved to a slightly open position.

FIG. 8 is a fragmentary perspective view of the front panel as viewed from the rear.

DETAILED DESCRIPTION

Referring now to FIGS. 1–8 there is shown a pet enclosure 12 embodying features of the present invention mounted to the exterior of a building, typically a house, having a wall 13. The pet enclosure 12 is shown mounted adjacent an elevated sliding screened window 14 in wall 13 with the window having a movable glass closure member 15 for selectively opening and closing the window and a typical screen 16 is shown across the window 14 to prevent insects from passing through the window when member 15 is in the open position.

The pet enclosure 12 includes a five-sided, oblong, main housing 18 and a smaller hollow side passageway member 19. The main housing 18 serves as an outside dwelling for the pet. The passageway member 19 enables the pet to move from the building into the main housing 18 and back when the window is open and is inhibited from passage when the window is closed.

The main housing 18 with an open back that fits against the building wall 13 has a front panel 21, top panel 22, bottom panel 23 and opposed left end panel 24 and right end panel 25. The main housing 18 is shown fastened to the building by screw fasteners 27 that extend through a frame member of each panel and thread into the building wall.

The side passageway member, 19 as a top panel 31, bottom panel 32, left end panel 33 and front panel 34. The top panel 31 has a top leg that extends inside the housing and receives a screw fastener to fasten to the building wall. The bottom panel 32 extends into the inside of the main housing about the same distance as top leg 31a.

Both the panels of the main housing and the side passageway members are made of a four-sided open framework 37, with each frame member typically of wood 1 inch by 2 inches, covered with a mesh material 38, typically wire mesh. In the construction for the end panels, the top panel 22, the bottom panel 23, and end panels 24 and 25 the wire mesh is folded over the outside edge and is stapled thereto. On the end panels 24 and 25 the mesh material extends along the inside of the frame and folds back over the outer edge as seen in FIG. 7.

On the bottom panel 23 the mesh material extends along the top surface of the frame and folds down over the outer edge as seen in FIG. 7. On the top panel the mesh material extends over the portion of the frame and folds up. A pad 39 is placed on bottom panel 23. When the front panel 21 is closed and locked the mesh material is locked in place because the staples cannot back out. The mesh material 38 is also secured in the same way between the back face of the main housing 18 and the building wall. The front panel has the mesh material stapled to the back face of the frame as shown in FIG. 8.

The side passageway member 19 has a first end 41 in communication with the inside of the building. A top frame member 42, outer frame member 43 and inner frame member 44 are mounted on the edges of the top panel 31 and end panel 33 and between the top and bottom panels 31 and 32, respectively, resembling three sides of a picture frame at the first end 41. In installing the device a hole is cut in the window screen 16 smaller than open end 41 and the edges of the screen are suitably fastened to frame members 42, 43 and 44 as by staples, an adhesive or the like. A barrier screen 45 of a flexible web material is attached across the opening in end 41 through which the pet will readily pass in either direction but inhibits the passage of insects into the building. Screen 34 is commonly known as a pet door. The second end 47 of member 19 opposite first end 41 is connected to the left end of panel 24 along the bottom thereof.

A convex mirror 49 is mounted on the top of side passageway member at the connection between the end panel 33 and front panel 34 to enable a person inside the building to view the pet inside the main housing 18.

The front panel 21 of the main housing 18 is to pivotally mounted at the top edge by a pair of laterally spaced hinges 48 to enable the front panel to pivot up like a door for access such to enable cleaning inside of the main housing. The front panel 21 has a pair of alignment pin holes 51 which receive an associated pair of dowels 52 projecting out from each end panel 24 and 25.

Two oppositely disposed hook latches 55 are provided on the end panels along each of the opposite ends of the housing to selectively latch the front panel in the closed position. Each latch 51 is located centrally or midway between the top and bottom of the main housing. Two additional hook latches 56 are provided along the bottom panel and bottom of the front panel to releasably fasten the front panel in place. Each hook latch includes a hook and a latch.

A padlock latch 58 is mounted to the front panel 21 and bottom panel 23 at a center position between the ends so that a padlock 59 fastened in the latch may be used to lock the front panel in a closed, locked position.

A left side shelf 61 is mounted to the building wall and left side panel at an elevated position between the top and bottom of the housing. A center shelf 62 is mounted to the building wall at an elevated position between the top and bottom panels and between the end panels. A right side shelf 63 is mounted to the building wall and right side panel at an elevated position between the top and bottom panels. These shelves are typically fastened by screw fasteners and provide a rest for the pets during their presence in the main housing.

By way of illustration and not limitation the depth of the main housing would be about 18 inches and the mirror of the convex type 4 inches in diameter. The mounting of the pet enclosure 12 above the ground avoids nose to nose outside animal contact and minimizes parasites. The above described pet enclosure readily installed on any sliding screened window and utilizes a conventional pet door to keep bugs out. Access is regulated by opening the window. The use of a double lock screen avoids breaking by the pet.

Although the present invention has been described with a certain degree of particularity, it is understood that the present disclosure has been made by way of example and that changes in details of structure may be made without departing from the spirit thereof.

What is claimed is:

1. A pet enclosure for mounting to the exterior of a building having a wall and a window above the ground with the window having a movable closure member for selectively opening and closing the window and a screen, said pet enclosure comprising:

a five-sided oblong main housing having front, top, bottom and opposed end panels and an open back, and a hollow side passageway member connected at a lower portion of one end of said housing, said side passageway member having a first end extending through and fastened to said screen for extending across a minor portion of a lower side portion of said window and a second end opposite said first end connected to said housing to permit a pet to pass between the inside of said building and main housing when said window is open and inhibiting such passage when said window is closed to provide a protected, controllable outside dwelling place for a pet above the ground.

2. The pet enclosure as set forth in claim 1 wherein said panels are made of an open, four-sided framework covered with a wire mesh material.

3. The pet enclosure as set forth in claim 2 wherein said wire mesh material on said top, bottom and end panels is folded over an outer edge and stapled to the associated frame and said front panel holds said staples in place in the closed position.

4. A pet enclosure for mounting to the exterior of a building having a wall with an elevated window with the window having a movable closure member for selectively opening and closing the window, said pet enclosure comprising:

a main housing having front, top, bottom and opposed end panels and an open back, a passageway member connected to said housing having a first end for extending across a portion of said window and a second end connected to said main housing to permit a pet to pass between the inside of said building and main housing when said window is open and inhibiting such passage when said window is closed to provide a protected dwelling place for a pet above the ground, and a mirror mounted on said passageway member to enable viewing of a pet in said main housing from inside the building.

* * * * *